(12) United States Patent
Takagi et al.

(10) Patent No.: US 10,876,604 B2
(45) Date of Patent: Dec. 29, 2020

(54) PULLEY APPARATUS FOR DRIVING-DRIVEN ROTATING MACHINE

(71) Applicant: DENSO CORPORATION, Kariya (JP)

(72) Inventors: Yoshito Takagi, Kariya (JP); Eitaro Tanaka, Kariya (JP)

(73) Assignee: DENSO CORPORATION, Kariya (JP)

(*) Notice: Subject to any disclaimer, the term of this patent is extended or adjusted under 35 U.S.C. 154(b) by 462 days.

(21) Appl. No.: 15/812,307

(22) Filed: Nov. 14, 2017

(65) Prior Publication Data

US 2018/0135731 A1 May 17, 2018

(30) Foreign Application Priority Data

Nov. 15, 2016 (JP) .................................. 2016-222368

(51) Int. Cl.
| | |
|---|---|
| *F16H 7/08* | (2006.01) |
| *F16H 55/54* | (2006.01) |
| *B60K 6/48* | (2007.10) |
| *B60K 6/485* | (2007.10) |
| *B60K 6/26* | (2007.10) |

(52) U.S. Cl.
CPC ............... *F16H 7/08* (2013.01); *F16H 55/54* (2013.01); *B60K 6/48* (2013.01); *B60K 6/485* (2013.01); *B60K 2006/268* (2013.01); *B60K 2006/4841* (2013.01); *F16H 2007/0868* (2013.01); *F16H 2007/0887* (2013.01)

(58) Field of Classification Search
CPC .......... F16H 55/52; F16H 55/54; F16H 55/36; F16H 55/40; F16H 55/49; F16H 7/08; F16H 7/14; F16H 7/16; F16H 2007/0865; F16H 2007/0868; F16H 55/563; F16H 55/566; B60K 6/48; B60K 6/485; B60K 2006/268; B60K 2006/4841
See application file for complete search history.

(56) References Cited

U.S. PATENT DOCUMENTS

| 370,087 A | * | 9/1887 | Riley | ...................... F16H 55/54 |
|---|---|---|---|---|
| | | | | 474/56 |
| 698,854 A | * | 4/1902 | Pratt | ........................ F16H 9/10 |
| | | | | 474/53 |

(Continued)

*Primary Examiner* — Michael R Mansen
*Assistant Examiner* — Raveen J Dias
(74) *Attorney, Agent, or Firm* — Oliff PLC

(57) ABSTRACT

In a pulley apparatus, belt supporting portions of belt support pieces, which support a belt from a radially inside thereof, are arranged along a circumferential direction of a power shaft and each have a predetermined circumferential length. In a pulley driven mode, the belt support pieces rotate about corresponding first supporting members in a direction making the belt supporting portions become closer to the power shaft with second supporting members being relatively moved in corresponding elongated holes toward radially outer ends thereof, causing the belt supporting portions to be reduced in radius. In a pulley driving mode, the belt support pieces rotate about the corresponding first supporting members in a direction making the belt supporting portions become further from the power shaft with the second supporting members being relatively moved in the corresponding elongated holes toward radially inner ends thereof, causing the belt supporting portions to be increased in radius.

6 Claims, 12 Drawing Sheets

(56) References Cited

U.S. PATENT DOCUMENTS

| | | | | |
|---|---|---|---|---|
| 2,004,224 A * | 6/1935 | Silber | | H02J 7/1476 474/50 |
| 3,935,751 A * | 2/1976 | Lee | | F16H 9/10 474/50 |
| 4,652,250 A * | 3/1987 | Reswick | | F16H 55/54 474/52 |
| 4,741,546 A * | 5/1988 | Reswick | | F16H 55/54 280/236 |
| 4,781,663 A * | 11/1988 | Reswick | | F16H 9/10 474/49 |
| 4,854,921 A * | 8/1989 | Kumm | | F16H 55/54 474/49 |
| 4,892,507 A * | 1/1990 | Patin | | F16H 9/10 474/50 |
| 5,520,583 A * | 5/1996 | Balingit | | F16H 55/54 474/50 |
| 5,582,555 A * | 12/1996 | Miller | | F16H 9/10 474/148 |
| 5,772,546 A * | 6/1998 | Warszewski | | B62M 9/08 474/50 |
| 6,432,009 B1 * | 8/2002 | Hansen | | B62M 9/08 474/148 |
| 2005/0148416 A1 * | 7/2005 | Naude | | B62M 9/08 474/49 |
| 2007/0054766 A1 * | 3/2007 | Shamis | | F16H 55/54 474/47 |
| 2009/0137353 A1 * | 5/2009 | Serkh | | F16H 55/54 474/49 |
| 2010/0234151 A1 | 9/2010 | Lin | | |
| 2011/0172042 A1 | 7/2011 | Lin | | |
| 2013/0065717 A1 * | 3/2013 | Easterday, III | | F16H 55/54 474/50 |
| 2016/0040772 A1 * | 2/2016 | Appleton | | F16H 55/54 474/55 |

* cited by examiner (I−I)

(V — V)

(VI – VI)

(VII – VII)

( VIII — VIII )

(IX—IX)

PULLEY APPARATUS FOR DRIVING-DRIVEN ROTATING MACHINE

CROSS-REFERENCE TO RELATED APPLICATION

This application is based on and claims priority from Japanese Patent Application No. 2016-222368 filed on Nov. 15, 2016, the content of which is hereby incorporated by reference in its entirety into this application.

BACKGROUND

1 Technical Field

The present invention relates to a pulley apparatus for a driving-driven rotating machine (or device) that has both a function of being mechanically driven at a driven load by an external rotating machine (or device) and a function of mechanically driving a high-load rotating machine (or device) that has a higher driven load than the driving-driven rotating machine.

The present invention is particularly suitable for application to a pulley apparatus for a vehicular motor-generator (i.e., driving-driven rotating machine) that has both a function of being mechanically driven by an engine of a motor vehicle to generate electric power and a function of generating mechanical power (or torque) to start the engine or assist the engine in driving the vehicle; in this case, the engine can be regarded both as an external rotating machine that mechanically drives the motor-generator at a driven load thereof and as a high-load rotating machine that has a higher driven load than the motor-generator and is mechanically driven by the motor-generator.

2 Description of Related Art

A motor vehicle generally includes a prime mover (e.g., an engine) and an alternator that is mechanically driven by the prime mover to generate electric power and thereby feed electrical loads provided in the vehicle and charge a battery. Moreover, a belt and pulley system, which includes a belt and pulleys, is employed to transmit mechanical power from the prime mover to the alternator.

In recent years, to improve fuel economy and reduce gas emissions, idle stop systems (or engine automatic stop/restart systems) have become widely employed in motor vehicles which are equipped with a gasoline or diesel engine.

In a motor vehicle which employs an idle stop system, the engine is frequently stopped and restarted. Therefore, if a conventional gear-meshing type starter is employed to start the engine, the gear-meshing noise generated during restart of the engine will lower the commercial value of the vehicle.

To solve the above problem, the alternator, which functions only as an electric generator, may be replaced with a motor-generator that operates selectively either in a generator mode or in a motor mode. In the generator mode, the motor-generator functions as an electric generator to generate electric power. More specifically, in the generator mode, the motor-generator is mechanically driven by the engine of the vehicle via the belt and pulley system. On the other hand, in the motor mode, the motor-generator functions as an electric motor to generate mechanical power (or torque), thereby driving the engine. For example, during restart of the engine, the motor-generator mechanically drives the engine via the belt and pulley system, thereby quietly starting the engine. In addition, the mechanical power generated by the motor-generator in the motor mode can also be used to assist the engine in driving the vehicle.

However, the load torque when mechanical power is transmitted from the motor-generator in the motor mode to the drive system of the vehicle is generally higher than that when mechanical power is transmitted from the engine to the motor-generator in the generator mode. Therefore, if the initial tension of the belt of the belt and pulley system is set to a required tension for the generator mode of the motor-generator, the tension of the belt will become insufficient in the motor mode of the motor-generator, causing the belt to slip against the pulleys; consequently, it will become impossible for mechanical power to be transmitted from the motor-generator to the drive system of the vehicle via the belt and pulley system.

Japanese Patent Application Publication No. JP2011185438A, an English equivalent of which is US 2010/0234151 A1, discloses a self-tensioning pulley apparatus which increases, when the load becomes high, the pulley diameter (or pitch) and thus the belt tension, thereby preventing slip of the belt.

Specifically, the self-tensioning pulley apparatus includes a first pulley means having a first pitch setting means, a second pulley means having a second pitch setting means, and a belt bearing means for bearing the belt. In operation, transmission of power loads the entire pulley apparatus so that all of the first pulley means, the second pulley means and the belt bearing means rotate together in the same direction at the same speed. Meanwhile, the second pulley means is caused by the load to rotate relative to the first pulley means in the opposite direction. This load-caused relative rotation between the first and second pulley means increases the pulley diameter by adjustment of the cooperation between the belt bearing means and the first and second pulley means. This pulley diameter-increasing adjustment is continued until a fixed length of the belt allows no further relative movement between the first and second pulley means. The increased belt tension due to the increased transmission power (or load) results in an increase in the pressure applied by the belt onto the belt bearing means. Consequently, slip of the belt is prevented and thus the power transmission via the pulley apparatus is sustained.

Moreover, the above patent document further discloses two configuration examples of the self-tensioning pulley apparatus. In the first configuration example, the belt bearing means is constituted of a plurality of belt bearing pins on which a flat belt is mounted. In the second configuration example, a V-belt is sandwiched between a pair of conical members axially opposed to each other.

However, in the first configuration example, the contact angle between the belt bearing means and the belt is reduced in comparison with that in an ordinary belt and pulley system. Consequently, the region (i.e., active arc) where mechanical power is transmitted between the belt bearing means and the belt becomes small, thereby lowering the power transmission capability of the belt and pulley system.

On the other hand, in the second configuration example, the belt is not supported on the radially inside thereof. Moreover, the load is applied to side surfaces of the belt by the pair of conical members. Consequently, the belt may be deformed in its width direction. Accordingly, the belt can be implemented by only belts which have a sufficient withstand load in the width direction thereof (e.g., a V-belt which has a sufficient thickness). Furthermore, as the pulley diameter increases with the transmission power, the load applied to the side surfaces of the belt also increases, thereby making it easier for the belt to be deformed in its width direction. As a result, the power transmission capability of the belt and pulley system may be lowered and the service life of the belt may be shortened.

Accordingly, if the self-tensioning pulley apparatus disclosed in the above patent document is applied to a vehicular motor-generator and the initial tension of the belt is set to the required tension for the generator mode of the motor-generator, the power transmission capability of the belt and pulley system may become insufficient in the motor mode of the motor-generator; consequently, it may become impossible for the motor-generator to start the engine. Therefore, the self-tensioning pulley apparatus disclosed in the above patent document is unsuitable for application to a vehicular motor-generator.

SUMMARY

According to exemplary embodiments, there is provided a pulley apparatus for a driving-driven rotating machine. The driving-driven rotating machine has both a function of being mechanically driven at a driven load by an external rotating machine and a function of mechanically driving a high-load rotating machine that has a higher driven load than the driving-driven rotating machine. The pulley apparatus is mounted on a power shaft of the driving-driven rotating machine and has a belt mounted thereon so that mechanical power is transmitted between the power shaft and a selected one of the external rotating machine and the high-load rotating machine via the pulley apparatus and the belt. The pulley apparatus includes: a plurality of belt support pieces each having a belt supporting portion to support the belt from a radially inside of the belt, the belt supporting portions of the belt support pieces being arranged along a circumferential direction of the power shaft and each having a predetermined circumferential length; a pair of flanges arranged respectively on opposite axial sides of the belt support pieces and configured to rotate together with the power shaft; a pair of belt guide members fitted respectively on radially outer peripheries of the pair of flanges in such a manner as to be rotatable relative to the pair of flanges; a plurality of first supporting members each of which is either fixed to the pair of flanges and rotatably fitted in a corresponding one of a plurality of fitting holes formed respectively in the belt support pieces or formed integrally with a corresponding one of the belt support pieces and rotatably fitted in a corresponding one of a plurality of fitting holes formed in the pair of flanges; and a plurality of second supporting members each of which is either fixed to the pair of belt guide members and inscribed in a corresponding one of a plurality of elongated holes formed respectively in the belt support pieces or formed integrally with a corresponding one of the belt support pieces and inscribed in a corresponding one of a plurality of elongated holes formed in the pair of belt guide members, each of the second supporting members being relatively movable in the corresponding elongated hole in an elongated direction of the corresponding elongated hole. Moreover, the belt support pieces are configured to be rotatable respectively about the corresponding first supporting members within a range where the corresponding second supporting members are relatively movable respectively in the corresponding elongated holes with relative rotation between the power shaft and the pair of belt guide members. The pulley apparatus is configured to operate in a pulley driven mode when mechanical power is transmitted from the external rotating machine to the power shaft via the pulley apparatus and the belt and in a pulley driving mode when mechanical power is transmitted from the power shaft to the high-load rotating machine via the pulley apparatus and the belt. In the pulley driven mode, the belt support pieces rotate respectively about the corresponding first supporting members in a direction making the belt supporting portions of the belt support pieces become closer to the power shaft with the corresponding second supporting members being relatively moved respectively in the corresponding elongated holes toward radially outer ends of the corresponding elongated holes, causing the belt supporting portions to be reduced in radius. In the pulley driving mode, the belt support pieces rotate respectively about the corresponding first supporting members in a direction making the belt supporting portions of the belt support pieces become further from the power shaft with the corresponding second supporting members being relatively moved respectively in the corresponding elongated holes toward radially inner ends of the corresponding elongated holes, causing the belt supporting portions to be increased in radius.

With the above configuration, when the operation of the driving-driven rotating machine is shifted from a driven rotating machine mode to a driving rotating machine mode and thus the operation of the pulley apparatus is shifted from the pulley driven mode to the pulley driving mode, it is possible to automatically increase the pulley diameter until the friction force between the belt and the belt supporting portions of the belt support pieces commensurate with the transmission power (or torque) in the driving rotating machine mode is obtained. That is, with the initial tension of the belt set to a suitable (or required) tension for the driven rotating machine mode, when the operation of the driving-driven rotating machine is shifted from the driven rotating machine mode to the driving rotating machine mode, it is possible to cause the belt supporting portions of the belt support pieces to be increased in radius and thereby increase the tension of the belt to be commensurate with the transmission power in the driving rotating machine mode. Consequently, with the increased tension of the belt, during the operation of the driving-driven rotating machine in the driving rotating machine mode, it is possible to reliably prevent the belt from slipping against the belt supporting portions of the belt support pieces. As a result, it is possible for the driving-driven rotating machine to reliably drive the high-load rotating machine in the driving rotating machine mode.

Moreover, with the above configuration, when the operation of the driving-driven rotating machine in the driving rotating machine mode is terminated and thus the operation of the driving-driven rotating machine is shifted from the driving rotating machine mode to the driven rotating machine mode, the operation of the pulley apparatus is accordingly shifted from the pulley driving mode to the pulley driven mode. Then, the belt supporting portions of the belt support pieces are reduced in radius and return to their initial state. Consequently, the tension of the belt is lowered to the initial tension that is set to the suitable tension for the driven rotating machine mode. As a result, it is possible to prevent the high load applied in the driving rotating machine mode from being continuously applied to the belt and the pulley apparatus in the driven rotating machine mode, thereby preventing excessive stress from being induced in, for example, a bearing that rotatably supports the power shaft.

Furthermore, with the above configuration, the belt is supported by the belt supporting portions of the belt support pieces each of which has the predetermined circumferential length. Consequently, it becomes possible to increase the contact angle between the belt and the belt supporting portions of the belt support pieces and thereby improve the power transmission capability in comparison with the first configuration example disclosed in the above-described patent document. In addition, as described previously, in the first configuration example disclosed in the above patent document, the belt is supported by a plurality of belt bearing pins.

Moreover, with the above configuration, the belt supporting portions of the belt support pieces support the belt from the radially inside of the belt. Consequently, it becomes possible to prevent flexure of the belt when the belt supporting portions of the belt support pieces are increased in radius and thus the tension of the belt is increased in the pulley driving mode. Furthermore, unlike in the second configuration example disclosed in the above patent document, there is no increase in the load applied to the side surfaces of the belt. As a result, it becomes possible to prevent deformation of the belt, thereby extending the service life of the belt. In addition, as described previously, in the second configuration example disclosed in the above patent document, the belt is sandwiched between a pair of conical members axially opposed to each other.

BRIEF DESCRIPTION OF THE DRAWINGS

The present invention will be understood more fully from the detailed description given hereinafter and from the accompanying drawings of exemplary embodiments, which, however, should not be taken to limit the present invention to the specific embodiments but are for the purpose of explanation and understanding only.

In the accompanying drawings.

DESCRIPTION OF EMBODIMENTS

Figure 1A:
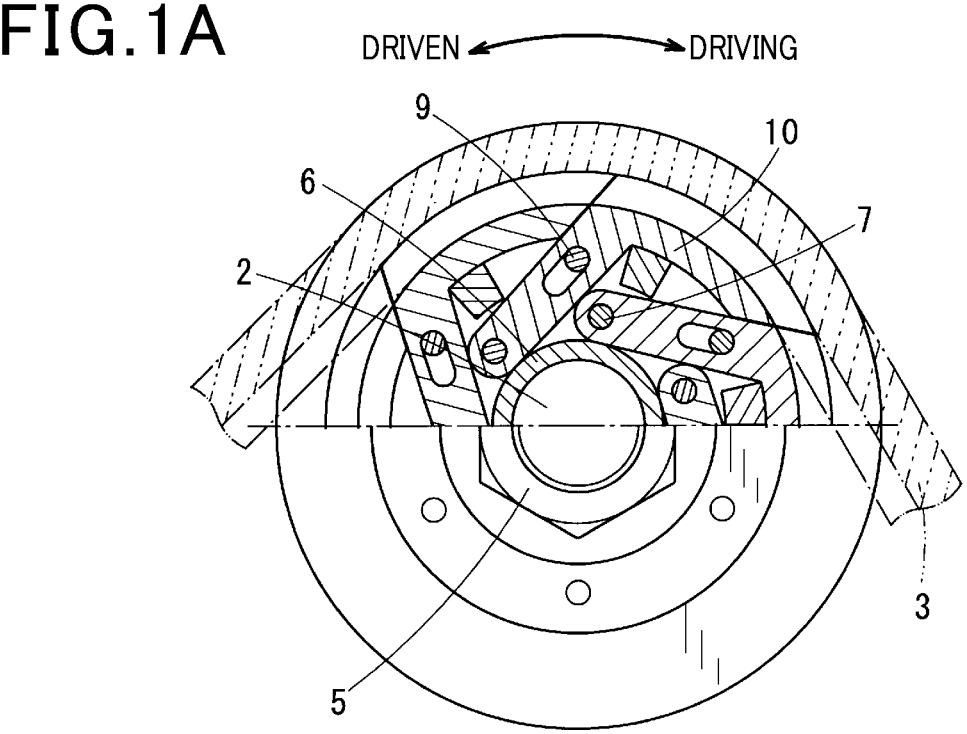
FIG. 1A is a half cross-sectional view, taken along the line I-I in FIG. 1B, of a pulley apparatus according to a first embodiment.

Exemplary embodiments will be described hereinafter with reference to FIGS. 1-15. It should be noted that for the sake of clarity and understanding, identical components having identical functions throughout the whole description have been marked, where possible, with the same reference numerals in each of the figures and that for the sake of avoiding redundancy, descriptions of identical components will not be repeated.

First Embodiment

Figure 1B:
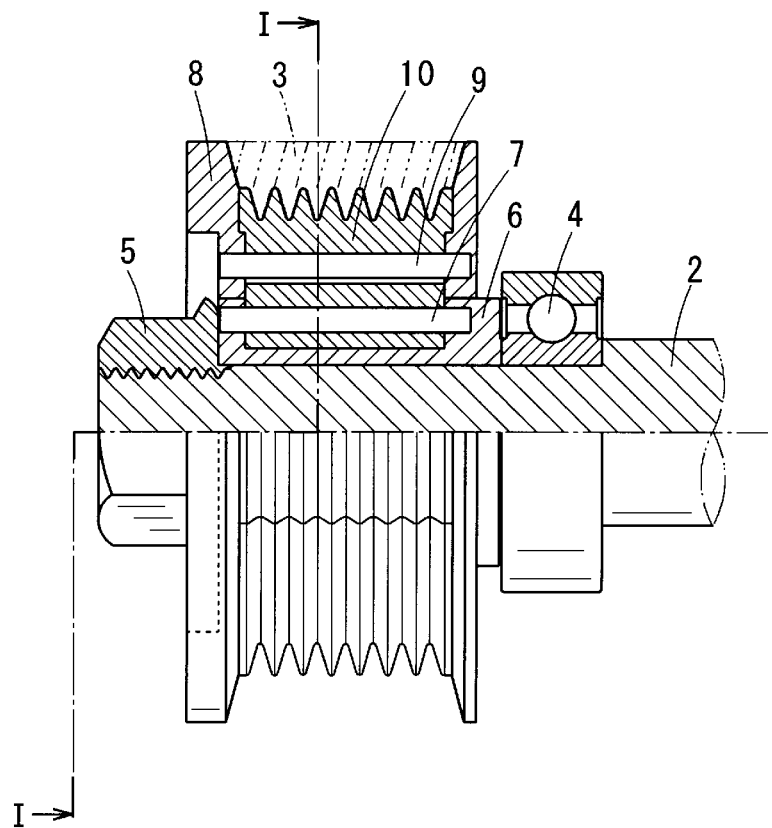
FIG. 1B is a half cross-sectional view, taken along an axial direction, of the pulley apparatus according to the first embodiment.

FIGS. 1A and 1B together show the overall configuration of a pulley apparatus 1 according to a first embodiment.

In the present embodiment, the pulley apparatus 1 is designed to be used in a motor vehicle to transmit mechanical power between a motor-generator and an engine of the vehicle.

In addition, the motor-generator can be regarded as a driving-driven rotating machine; the engine can be regarded both as an external rotating machine that mechanically drives the motor-generator at a driven load of the motor-generator to generate electric power and as a high-load rotating machine that has a higher driven load than the motor-generator and is driven by mechanical power generated by the motor-generator. Specifically, the motor-generator operates selectively either in a generator mode or in a motor mode. In the generator mode, the motor-generator functions as an electric generator to generate electric power. More specifically, in the generator mode, the motor-generator is mechanically driven by the engine via the pulley apparatus 1. On the other hand, in the motor mode, the motor-generator functions as an electric motor to generate mechanical power (or torque), thereby driving the engine. For example, in the case of the vehicle employing an idle stop system (or engine automatic stop/restart system), during restart of the engine, the motor-generator mechanically drives the engine via the pulley apparatus 1, thereby quietly starting the engine. In addition, the mechanical power generated by the motor-generator in the motor mode can also be used to assist the engine in driving the vehicle.

Figure 1C:
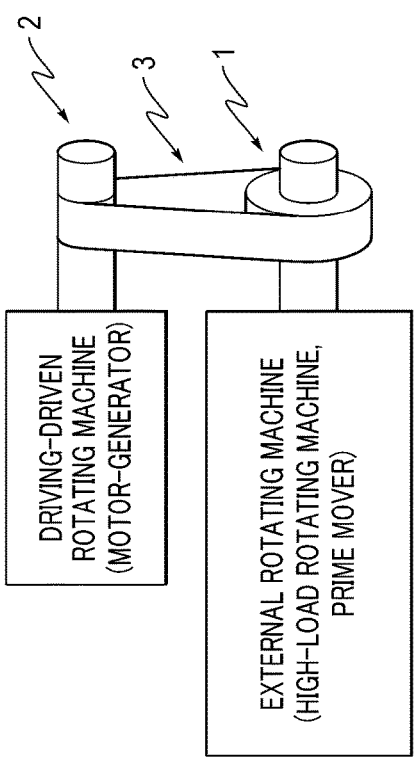
FIG. 1C is a schematic drawing of the pulley apparatus according to the first embodiment in use with a driving-driven rotating machine (motor-generator) and an external rotating machine (high-load rotating machine, prime mover).

As shown in FIGS. 1A-1C, the pulley apparatus 1 is mounted on a power shaft (or input/output shaft) 2 of the motor-generator, so as to transmit mechanical power between it and a crank pulley (not shown), which is mounted on a crankshaft of the engine, via a belt 3. That is, the pulley apparatus 1, the crank pulley and the belt 3 together constitute a belt and pulley system for transmitting mechanical power between the motor-generator and the engine.

Figure 2:
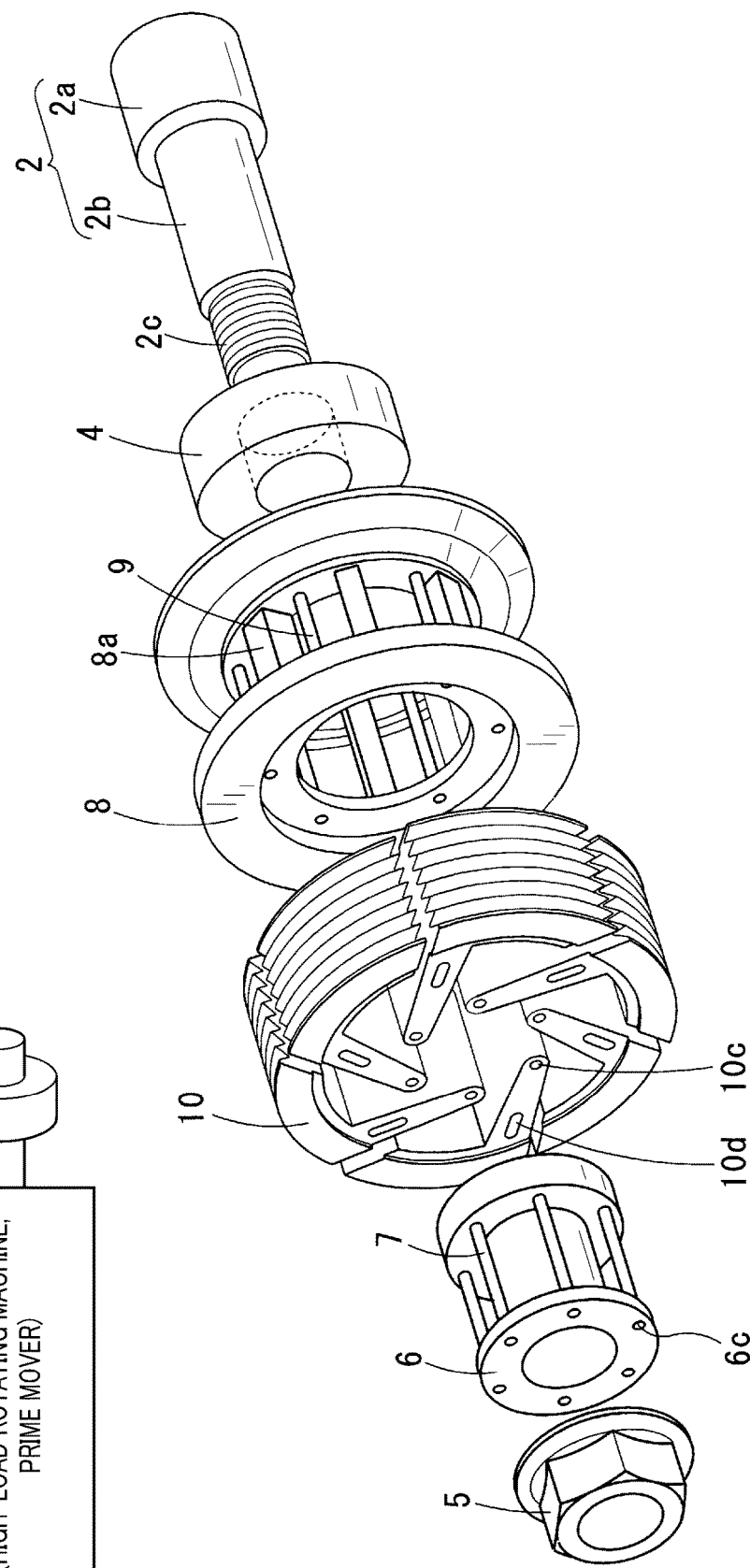
FIG. 2 is an exploded perspective view of the pulley apparatus according to the first embodiment.

As shown in FIG. 2, the power shaft 2 is stepped on its outer peripheral surface to have a main shaft part 2a and a pulley-mounting part 2b; the pulley-mounting part 2b has a smaller diameter than the main shaft part 2a.

Referring back to FIG. 1B, on the pulley-mounting part 2b of the power shaft 2, there are mounted the pulley apparatus 1 and a ball bearing 4 on the main shaft part 2a side (i.e., the right side in FIG. 1B) of the pulley apparatus 1. The ball bearing 4 is provided for rotatably supporting the power shaft 2. Moreover, a distal end portion of the pulley-mounting part 2b, which is on the opposite side of the pulley apparatus 1 to the ball bearing 4, is threaded to form a threaded portion 2c. On the threaded portion 2c, there is fastened a nut 5 to fix the pulley apparatus 1 to the power shaft 2.

The belt 3 is formed, for example, of rubber and configured as a V-ribbed belt. More specifically, the belt 3 has a plurality of ribs arranged in its width direction (i.e., the left-right direction in FIG. 1B); each of the ribs has a V-shaped cross section.

As shown in FIGS. 1A-1B and 2, in the present embodiment, the pulley apparatus 1 includes a collar member 6, a plurality of first supporting shafts 7, a pair of belt guide members 8, a plurality of second supporting shafts 9 and a plurality of belt support pieces 10.

Figure 3:
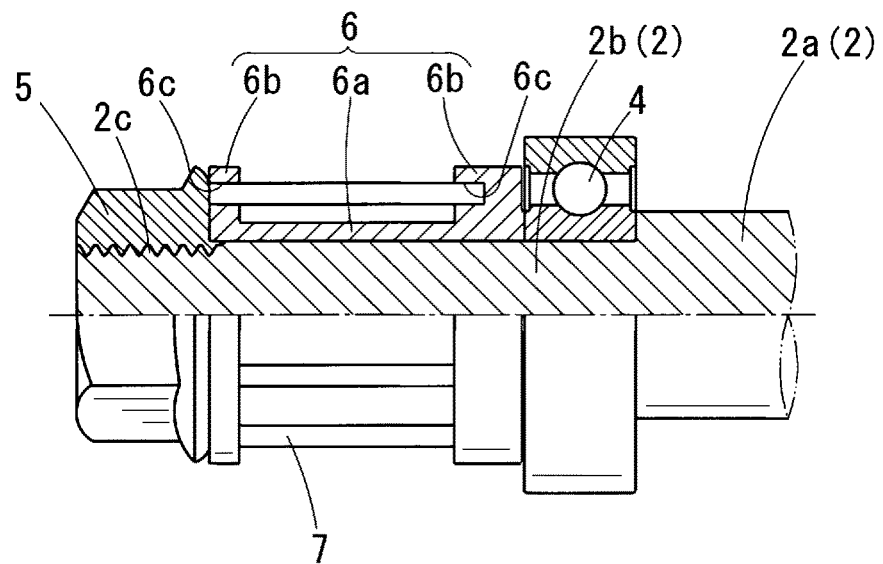
FIG. 3 is a half cross-sectional view, taken along the axial direction, of a collar member fixed on a power shaft in the pulley apparatus according to the first embodiment.

As shown in FIG. 3, the collar member 6 is configured to include a hollow cylindrical main body 6a and a pair of flanges 6b. The main body 6a is fitted on the outer periphery of the pulley-mounting part 2b of the power shaft 2 so as to be adjacent to the ball bearing 4. The flanges 6b are formed respectively at opposite axial ends of the main body 6a. Each of the flanges 6b has a plurality of mounting holes 6c formed therein at equal intervals in a circumferential direction of the collar member 6. Moreover, the collar member 6 is fixed to the power shaft 2 by fastening the nut 5 onto the threaded portion 2c of the power shaft 2, so as to rotate together with the power shaft 2.

Each of the first supporting shafts 7 is shaped in a long shaft (or bar) with a circular cross section. The first supporting shafts 7 are arranged at equal intervals in the circumferential direction of the collar member 6. Each of the first supporting shafts 7 has its opposite axial end portions respectively fitted and thereby fixed in a corresponding one of the mounting holes 6c of one of the pair of flanges 6b of the collar member 6 and a corresponding one of the mounting holes 6c of the other of the pair of flanges 6b. Consequently, each of the first supporting shafts 7 is fixed to the pair of flanges 6b of the collar member 6.

Figure 4:
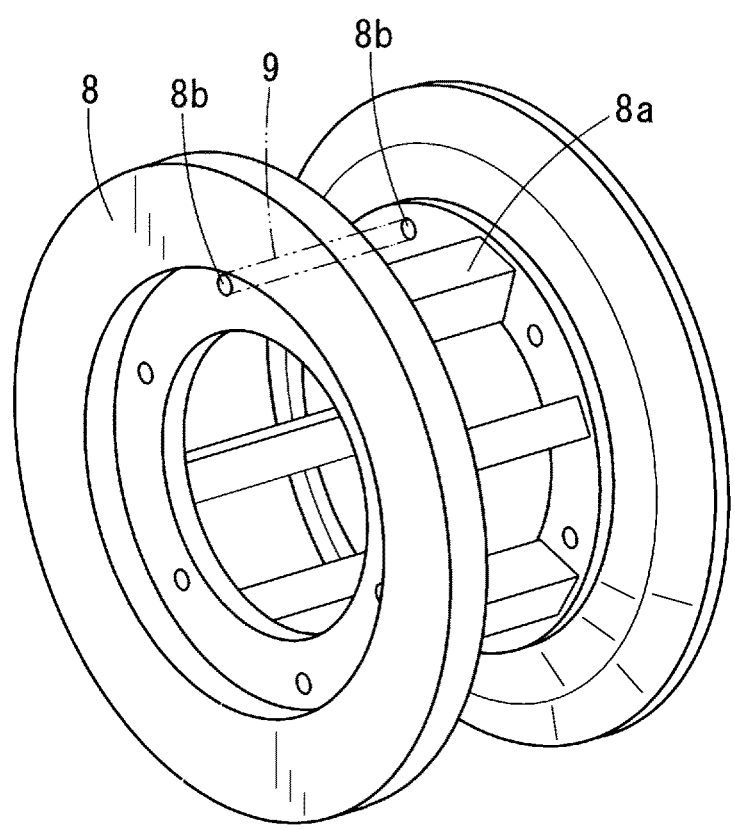
FIG. 4 is a perspective view of a belt guide member of the pulley apparatus according to the first embodiment.

As shown in FIG. 4, each of the belt guide members 8 is annular in shape (or ring-shaped). Moreover, each of the belt guide members 8 has a plurality of mounting holes 8b formed therein at equal intervals in the circumferential direction thereof. The belt guide members 8 are connected with each other by a plurality of prismatic members 8a. The prismatic members 8a are circumferentially arranged at equal intervals, forming a prismatic space between each circumferentially-adjacent pair of the prismatic members 8a.

Referring back to FIG. 1B, the belt guide members 8 are fitted respectively on radially outer peripheries of the flanges 6b of the collar member 6 in such a manner as to be rotatable relative to the flanges 6b. Moreover, the belt guide members 8 are arranged respectively on opposite sides of the belt 3 in the width direction of the belt 3 so as to respectively guide opposite side surfaces of the belt 3.

Each of the second supporting shafts 9 is shaped in a long shaft (or bar) with a circular cross section. The second supporting shafts 9 are arranged at equal intervals in the circumferential direction of the belt guide members 8. Each of the second supporting shafts 9 has its opposite axial end portions respectively fitted and thereby fixed in a corresponding one of the mounting holes 8b of one of the pair of belt guide members 8 and a corresponding one of the mounting holes 8b of the other of the pair of belt guide members 8. Consequently, each of the second supporting shafts 9 is fixed to the pair of belt guide members 8.

As shown in FIGS. 5A-5B, 6 and 8, the belt support pieces 10 are arranged around the power shaft 2 (or along the circumferential direction of the power shaft 2) and together constitute a belt support for supporting the belt 3. Each of the belt support pieces 10 has a leg portion 10a and an arcuate portion 10b. The leg portion 10a is inserted in a corresponding one of the prismatic spaces formed between the prismatic members 8a. The arcuate portion 10b is formed radially outside the leg portion 10a to define an arc-shaped radially outer periphery of the belt support piece 10.

Moreover, in the leg portion 10a, there are formed a fitting hole 10c and an elongated hole 10d both of which axially penetrate the leg portion 10a. The fitting hole 10c is circular in shape and has a corresponding one of the first supporting shafts 7 rotatably fitted therein. The elongated hole 10d is elongated in one direction (i.e., in the longitudinal direction of the belt support piece 10 in the present embodiment) and has a corresponding one of the second supporting shafts 9 inscribed therein so as to be relatively movable in the elongated hole 10d in the elongated direction thereof.

Figure 5A:
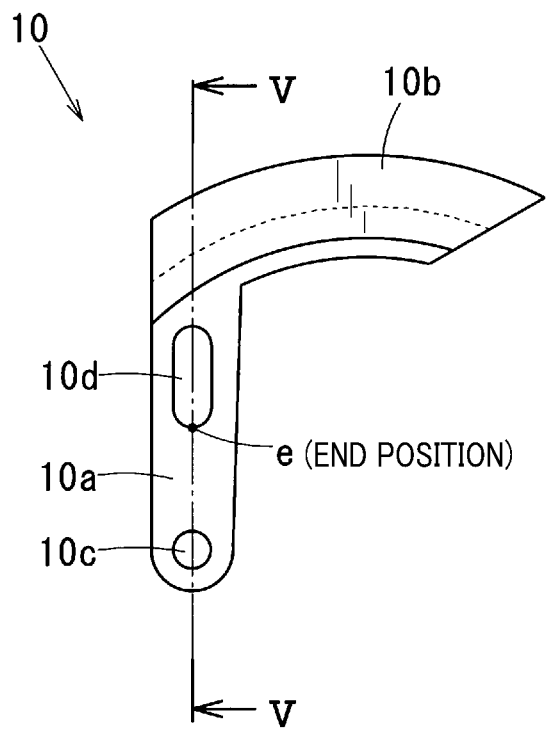
FIG. 5A is a plan view of one of belt support pieces of the pulley apparatus according to the first embodiment.
Figure 5B:
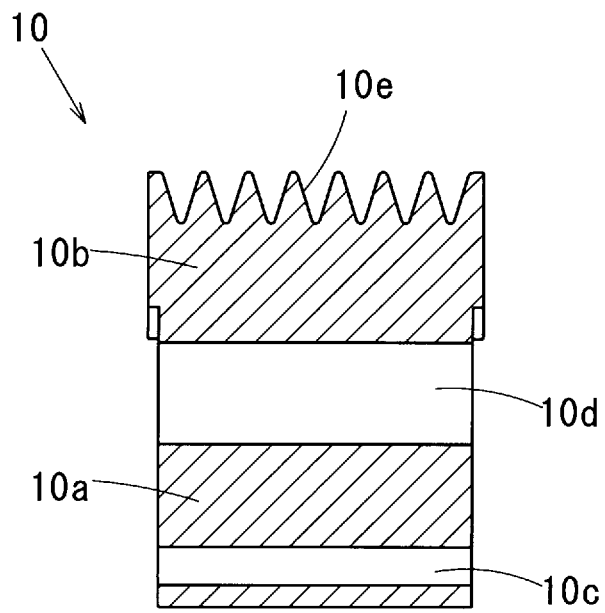
FIG. 5B is a cross-sectional view, taken along the line V-V in FIG. 5A, of the belt support piece.

On a radially outer surface of the arcuate portion 10b, there is formed a belt supporting portion 10e on which the belt 3 is mounted and runs. As shown in FIG. 5A, the belt supporting portion 10e is formed over the entire circumferential length of the arcuate portion 10b. Moreover, as shown in FIG. 5B, the belt supporting portion 10e has a cross section perpendicular to the circumferential direction which is shaped to match a cross section of the V-ribbed belt 3 perpendicular to the longitudinal direction of the belt 3. That is, the belt supporting portion 10e is formed to have a plurality of V-shaped ribs arranged in the width direction of the belt support piece 10.

In the present embodiment, each of the belt support pieces 10 is configured to be rotatable about the corresponding first supporting shaft 7 within a range where the corresponding second supporting shaft 9 is relatively movable in the elongated hole 10d of the belt support piece 10; depending on the direction of the rotation, the belt supporting portions 10e of the belt support pieces 10 are reduced or increased in radius (or diameter).

Hereinafter, the distance from the axis of the power shaft 2 to the belt supporting portions 10e of the belt support pieces 10 will be referred to as "pulley radius" (see R2 shown in FIG. 10). Moreover, a parameter which represents twice the pulley radius will be referred to as "pulley diameter". Accordingly, the expression "the belt supporting portions 10e of the belt support pieces 10 are reduced in radius"

denotes that the pulley diameter is reduced with rotation of the belt support pieces 10 about the corresponding first supporting shafts 7; the expression "the belt supporting portions 10e of the belt support pieces 10 are increased in radius" denotes that the pulley diameter is increased with rotation of the belt support pieces 10 about the corresponding first supporting shafts 7.

Figure 6:
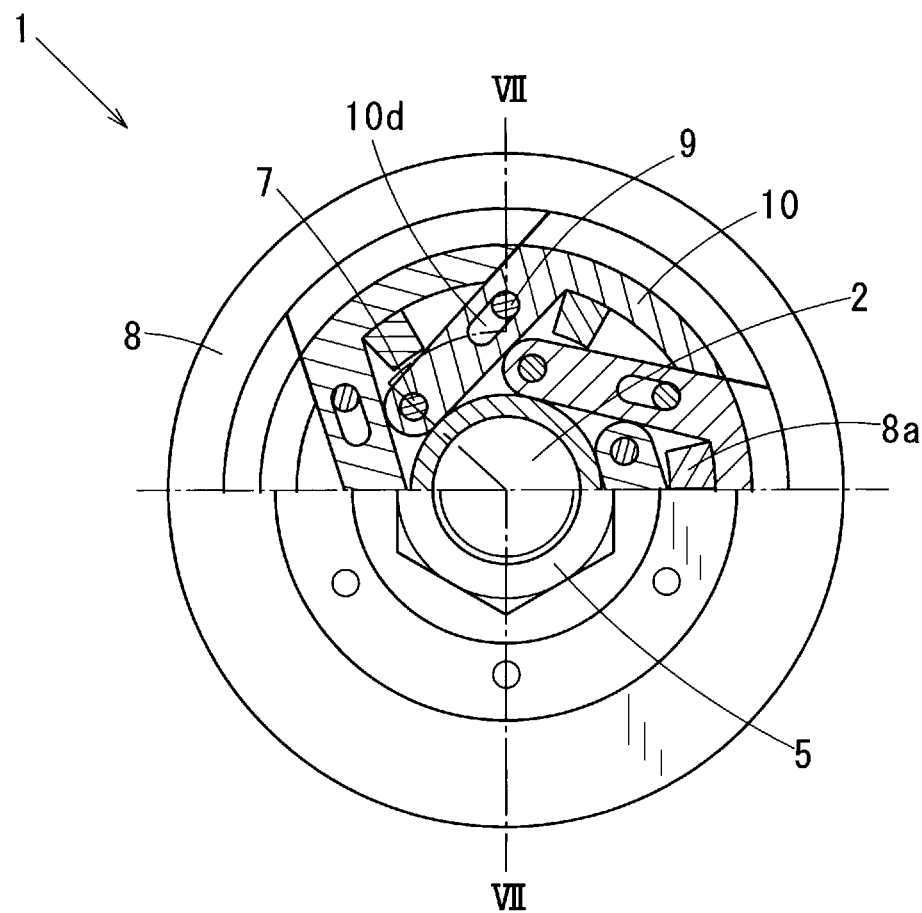
FIG. 6 is a half cross-sectional view, taken along the line VI-VI in FIG. 7, of the pulley apparatus according to the first embodiment, wherein the pulley apparatus is in a pulley diameter-reduced state.
Figure 7:
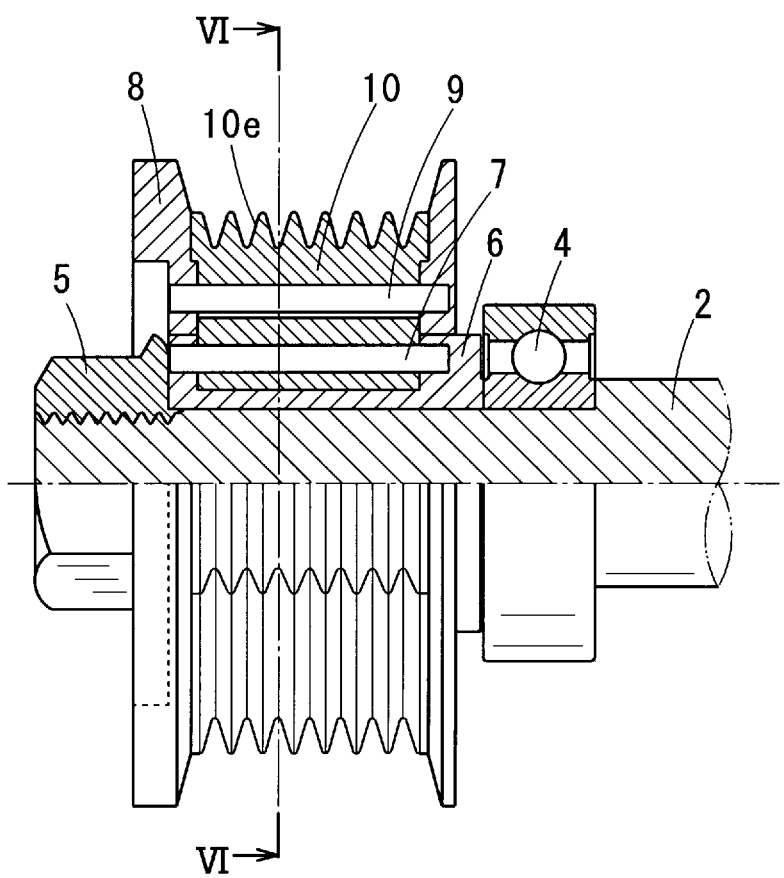
FIG. 7 is a half cross-sectional view, taken along the line VII-VII in FIG. 6, of the pulley apparatus according to the first embodiment, wherein the pulley apparatus is in the pulley diameter-reduced state.

FIGS. 6 and 7 illustrate the pulley apparatus 1 in a state where the belt supporting portions 10e of the belt support pieces 10 are reduced in radius. The pulley apparatus 1 is in this state when the motor-generator is mechanically driven by the engine to function as an electric generator or the engine is in a stopped state.

Hereinafter, the operation mode of the pulley apparatus 1 when the motor-generator is mechanically driven by the engine to function as an electric generator will be referred to as a "pulley driven mode". In the pulley driven mode, the tension of the belt 3 is preset to an initial tension with which it is possible for the belt and pulley system to transmit necessary mechanical power from the engine to the motor-generator for enabling the motor-generator to function as an electric generator. Moreover, in the pulley driven mode, each of the belt support pieces 10 rotates about the corresponding first supporting shaft 7 in a direction making the belt supporting portion 10e of the belt support piece 10 become closer to the power shaft 2 (i.e., in the clockwise direction in FIG. 6) with the corresponding second supporting shaft 9 being relatively moved in the elongated hole 10d of the belt support piece 10 toward a radially outer end of the elongated hole 10d, resulting in a reduction in radius of the belt supporting portions 10e of the belt support pieces 10.

Figure 8:
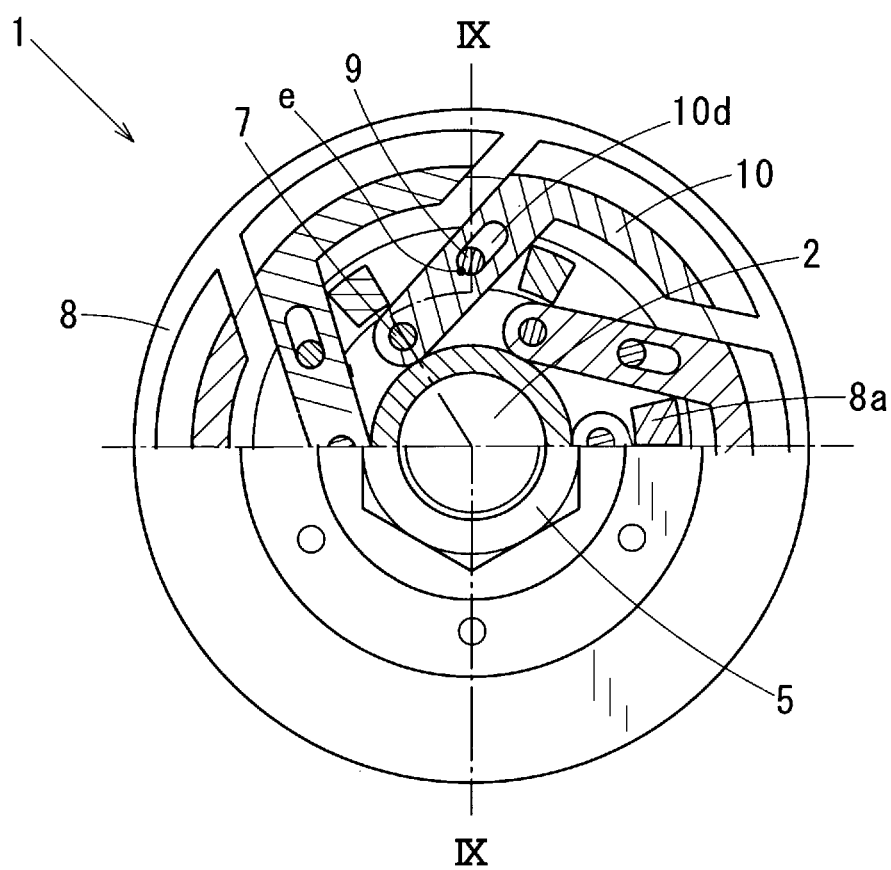
FIG. 8 is a half cross-sectional view, taken along the line VIII-VIII in FIG. 9, of the pulley apparatus according to the first embodiment, wherein the pulley apparatus is in a pulley diameter-increased state.
Figure 9:
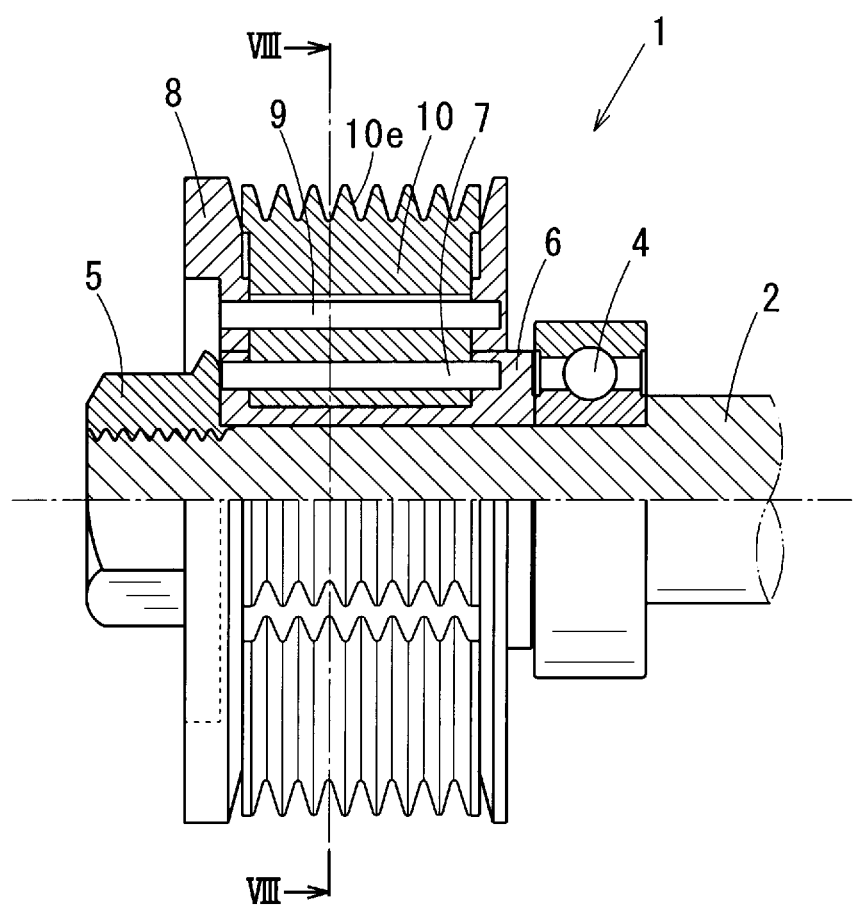
FIG. 9 is a half cross-sectional view, taken along the line IX-IX in FIG. 8, of the pulley apparatus according to the first embodiment, wherein the pulley apparatus is in the pulley diameter-increased state.

FIGS. 8 and 9 illustrate the pulley apparatus 1 in a state where the belt supporting portions 10e of the belt support pieces 10 are increased in radius. The pulley apparatus 1 is in this state when the motor-generator functions as an electric motor to generate mechanical power (or torque), thereby driving the engine or assisting the engine in driving the vehicle.

Hereinafter, the operation mode of the pulley apparatus 1 when the motor-generator functions as an electric motor to drive the engine or assist the engine in driving the vehicle will be referred to as a "pulley driving mode". In the pulley driving mode, each of the belt support pieces 10 rotates about the corresponding first supporting shaft 7 in a direction making the belt supporting portion 10e of the belt support piece 10 become further from the power shaft 2 (i.e., in the counterclockwise direction in FIG. 8) with the corresponding second supporting shaft 9 being relatively moved in the elongated hole 10d of the belt support piece 10 toward a radially inner end of the elongated hole 10d, resulting in an increase in radius of the belt supporting portions 10e of the belt support pieces 10. In addition, the increase in radius of the belt supporting portions 10e of the belt support pieces 10 is limited by a radially inner end position e of each of the elongated holes 10d of the belt support pieces 10 (see FIG. 5A).

Next, with reference to FIG. 10, a more detailed explanation will be given of how the belt supporting portions 10e of the belt support pieces 10 are increased in radius in the pulley driving mode.

Figure 10:
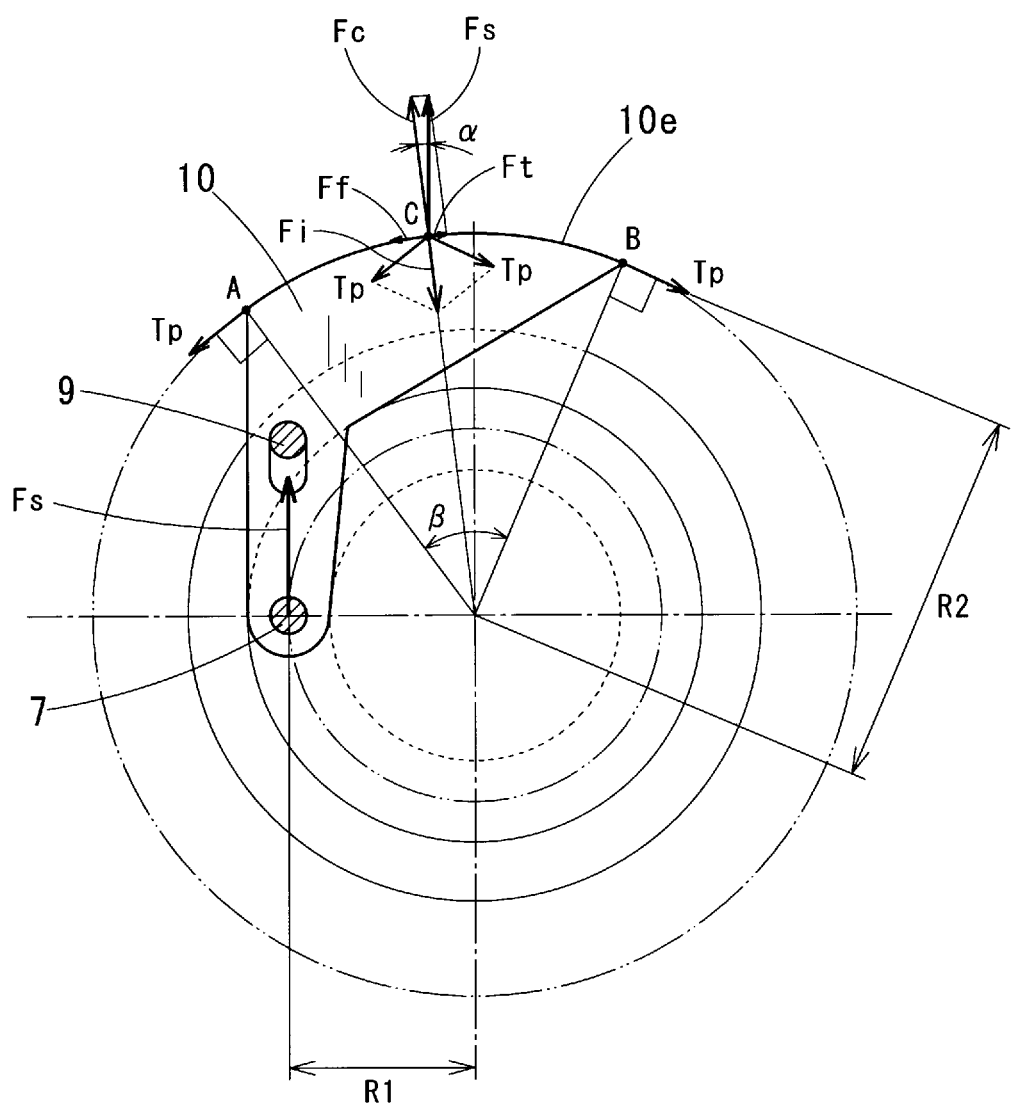
FIG. 10 is a schematic view illustrating operation of the pulley apparatus according to the first embodiment.

FIG. 10 is a vector diagram illustrating the balance of forces acting on each belt support piece 10 in the pulley driving mode. It should be noted that for the sake of simplicity, only one of the belt support pieces 10 is depicted in FIG. 10.

When the belt 3 is provided to run over the entire circumferential range of the belt support piece 10 (i.e., the circumferential range between points A and B in FIG. 10), the initial tension Tp acts in the tangential direction at each of the circumferential ends (i.e., the points A and B in FIG. 10) of the belt supporting portion 10e of the belt support piece 10. Consequently, as the resultant force of the initial tensions Tp acting respectively at the circumferential ends A and B of the belt supporting portion 10e, a load Fi is applied to the belt support piece 10 radially inward at the circumferential center C of the belt supporting portion 10e.

The load Fi can be expressed by the following equation (1):

$$Fi = 2 \times Tp \cdot \sin(\beta/2) \tag{1}$$

where $\beta$ is the center angle between two imaginary lines radially extending respectively through the circumferential ends A and B of the belt supporting portion 10e (or the angular range of the belt supporting portion 10e).

Moreover, when the belt 3 is driven by drive torque (or mechanical power) generated by the motor-generator, a load Fs is further applied to the belt support piece 10 at the position of the axis of the corresponding first supporting shaft 7 in a direction tangential to a circle through the position of the axis of the corresponding first supporting shaft 7. Furthermore, when the application direction of the load Fs makes a given angle with the application direction of the load Fi, loads Fc and Ft, which are components of the load Fs, are applied at the circumferential center C of the belt supporting portion 10e. Specifically, the load Fc is the radially outward component of the load Fs while the load Ft is the tangential component of the load Fs.

The loads Fc and Ft can be expressed respectively by the following equations (2) and (3):

$$Fc = Fs \cdot \cos \alpha \tag{2}$$

$$Ft = Fs \cdot \sin \alpha \tag{3}$$

where $\alpha$ is the angle between the application direction of the load Fs and the application direction of the load Fc.

When the drive torque of the motor-generator increases, the load Fs applied to the belt support piece 10 also increases; thus the load Fc, which is the radially outward component of the load Fs, increases accordingly. However, increase in radius of the belt supporting portions 10e of the belt support pieces 10 is not started until the load Fc has increased to balance the load Fi.

When the load Fc balances the load Fi (i.e., Fc=Fi), the load Ft can be expressed by the following equation (4) that is derived from the above equations (1), (2) and (3):

$$\begin{aligned} Ft &= Fc \cdot \sin \alpha / \cos \alpha \\ &= 2 \times Tp \cdot \sin(\beta/2) \cdot \tan \alpha \end{aligned} \tag{4}$$

On the other hand, the friction force Ff, which is caused by the tension of the belt 3 to act on contact surfaces of the belt 3 and the belt supporting portion 10e of the belt support piece 10, can be expressed by the following equation (5):

$$\begin{aligned} Ff &= \mu \cdot Fi \\ &= \mu \cdot 2 \times Tp \cdot \sin(\beta/2) \end{aligned} \tag{5}$$

where $\mu$ is the coefficient of friction between the contact surfaces.

Let $Q_1$ be the drive torque generated by the motor-generator when the load Fc balances the load Fi. Let R1 be the distance from the axis of the power shaft 2 to the axis of the corresponding first supporting shaft 7. Let na be the apparent number of the belt support pieces 10 being in contact with the belt 3. Then, Q1 can be expressed by the following equation (6):

$$Q_1 = na \cdot R1 \cdot Fs \tag{6}$$

Moreover, the load Fs when the load Fc balances the load Fi (i.e., Fc=Fi) can be expressed by the following equation (7) that is derived from the above equations (1) and (2):

$$\begin{aligned} Fs &= Fc/\cos\alpha = Fi/\cos\alpha \\ &= 2 \times Tp \cdot \sin(\beta/2)/\cos\alpha \end{aligned} \tag{7}$$

Substituting the above equation (7) into the above equation (6), the following equation (8) can be obtained:

$$Q_1 = na \cdot R1 \cdot 2 \times Tp \cdot \sin(\beta/2)/\cos\alpha \tag{8}$$

Here, the following conditions are set as an example.

The distance from the axis of the power shaft 2 to the axis of the corresponding first supporting shaft 7: R1=12 mm.

The number of the belt support pieces 10: n=6.

The center angle of the belt supporting portion 10e: $\beta=360°/n=60°$.

The contact angle between the belt support pieces 10 and the belt 3: $\theta=120°=2.0944$ rad.

The apparent number of the belt support pieces 10 being in contact with the belt 3: na=120°/(360°/6)=2.

The angle between the application direction of the load Fs caused by the drive torque and the normal direction at the circumferential center C of the belt supporting portion 10e: $\alpha=8°$.

The initial tension of the belt 3: Tp=350N.

The coefficient of friction between the contact surfaces of the belt 3 and the belt supporting portion 10e: $\mu=1.2$.

Based on the above conditions, the drive torque $Q_1$, the tangential load Ft and the friction force Ff can be calculated respectively by the following equations (9), (10) and (11):

$$\begin{aligned} Q_1 &= 2 \times 0.012 \times 2 \times 350 \times \sin(60°/2) \div \cos 8° \\ &= 2 \times 0.012 \times 2 \times 350 \times 0.5 \div 0.9903 = 8.483[\text{Nm}] \end{aligned} \tag{9}$$

$$\begin{aligned} Ft &= 2 \times 350 \times \sin(60°/2) \times \tan 8° \\ &= 2 \times 350 \times 0.5 \times 0.1405 = 49.2[\text{N}] \end{aligned} \tag{10}$$

$$\begin{aligned} Ff &= 1.2 \times 2 \times 350 \times \sin(60°/2) \\ &= 1.2 \times 2 \times 350 \times 0.5 = 420[\text{N}] \end{aligned} \tag{11}$$

From the results of the above equations (10) and (11), it can be seen that Ff>Ft. Consequently, the belt 3 is prevented from slipping against the belt support pieces 10.

In addition, as shown in FIG. 10, the tangential load Ft is applied at the circumferential center C of the belt supporting portion 10e in the feed direction (or advancing direction) of the belt 3. That is, the tangential load Ft is applied in the direction of increasing the tension of the belt 3 at the circumferential end A of the belt supporting portion 10e which is located backward of the circumferential center C of the belt supporting portion 10e while reducing the tension of the belt 3 at the circumferential end B of the belt supporting portion 10e which is located forward of the circumferential center C. The difference between the tension of the belt 3 at the circumferential end A and the tension of the belt 3 at the circumferential end B constitutes a force that is transmitted to drive the crank pulley of the engine; the product of the force and the radius of belt supporting portions of the crank pulley constitutes torque for driving the engine.

Moreover, the following conditions are further set as an example.

The pulley radius (i.e., the distance from the axis of the power shaft 2 to the belt supporting portions 10e of the belt support pieces 10): R2=25 mm.

The required torque for starting the engine: Q=48 Nm.

The required rotational speed for starting the engine: N=250 rpm.

Based on the above conditions, the force F applied to the belt 3 and the speed V of the belt 3 can be calculated respectively by the following equations (12) and (13):

$$\begin{aligned} F &= (Q/R2) \times 1000 \\ &= (48/25) \times 1000 = 1920[\text{N}] \end{aligned} \tag{12}$$

$$\begin{aligned} V &= 2\pi R2N/(1000 \times 60) \\ &= 2\pi \times 25 \times 250 \div 60000 = 0.654[\text{m/sec}] \end{aligned} \tag{13}$$

Further, based on the above-calculated F and V, the required transmission power P of the belt 3 for starting the engine can be calculated by the following equation (14):

$$\begin{aligned} P &= F \cdot V/1000 \\ &= 1920 \times 0.654 \div 1000 = 1.256[\text{kW}] \end{aligned} \tag{14}$$

Moreover, the required effective tension Te of the belt 3 for starting the engine, which is equal to the force F applied to the belt 3, can be calculated by the following equation (15):

$$\begin{aligned} Te &= 1000 \cdot P/V \\ &= 1000 \times 1.256 \div 0.654 = 1920[\text{N}] \end{aligned} \tag{15}$$

In addition, the effective tension Te is equal to the difference between the tight side tension Tt and the slack side tension Ts of the belt 3.

The theoretical initial tension To of the belt 3 can be determined by the following equation (16):

$$\begin{aligned} To &= (Tt + Ts)/2 \\ &= (Te/2) \cdot (e^{\wedge}\mu\theta + 1)/(e^{\wedge}\mu\theta - 1) \end{aligned} \tag{16}$$

Further, the theoretical initial tension To can be calculated by the following equation (17) that is derived by substituting $\mu=1.2$ and $\theta=2.0944$ rad into the above equation (16):

$$\begin{aligned} To &= (1920/2) \cdot (e^{\wedge} \times 1.2 \times 2.0944 + 1)/(e^{\wedge} \times 1.2 \times 2.0944 - 1) \\ &= 1129[\text{N}] \end{aligned} \tag{17}$$

Furthermore, the following conditions are further set as an example.

The elastic modulus (per 100 mm) of the belt 3: D=1182 N/m.

The overall length of the belt 3: L=1200 mm.

Based on the above conditions, the amount of increase ΔL in the overall length L of the belt 3 required to obtain the theoretical initial tension To can be calculated by the following equation (18):

$$\Delta L = [(To - Tp)/D] \times (L/100) \quad (18)$$
$$= [(1129 - 350)/1182] \times (1200/100) = 7.91 [mm]$$

Further, the amount of increase ΔR in the pulley radius R2 required to obtain the above-calculated ΔL can be calculated by the following equation (19):

$$\Delta R = (\Delta L/2\pi) \times (360/120) \quad (19)$$
$$= (7.91/2\pi) \times (360/120) = 3.8 [mm]$$

Accordingly, from the result of the above equation (19), it can be seen that for starting the engine, it is required for the belt supporting portions 10e of the belt support pieces 10 to be increased in radius by 3.8 mm.

Next, the operational effects of the pulley apparatus 1 according to the present embodiment will be described.

In the present embodiment, the pulley apparatus 1 is provided for the vehicular motor-generator which is a driving-driven rotating machine, as shown in FIG. 1C. The motor-generator has both a function of being mechanically driven at a driven load thereof by the engine and a function of mechanically driving the engine that has a higher driven load than the motor-generator. That is, in the present embodiment, the engine constitutes (or functions as) both an external rotating machine that mechanically drives the motor-generator at the driven load thereof and a high-load rotating machine that has a higher driven load than the motor-generator and is mechanically driven by the motor-generator. The pulley apparatus 1 is mounted on the power shaft 2 of the motor-generator and has the belt 3 mounted thereon so that mechanical power is transmitted between the power shaft 2 and the engine via the pulley apparatus 1 and the belt 3. The pulley apparatus 1 includes the belt support pieces 10, the pair of flanges 6b, the pair of belt guide members 8, the first supporting shafts (or members) 7 and the second supporting shafts (or members) 9. Each of the belt support pieces 10 has the belt supporting portion 10e formed therein to support the belt 3 from the radially inside of the belt 3. The belt supporting portions 10e of the belt support pieces 10 are arranged along the circumferential direction of the power shaft 2 and each have a predetermined circumferential length. The pair of flanges 6b are arranged respectively on opposite axial sides of the belt support pieces 10 and configured (more particularly, fixed to the power shaft 2 in the present embodiment) to rotate together with the power shaft 2. The pair of belt guide members 8 are fitted respectively on the radially outer peripheries of the pair of flanges 6b in such a manner as to be rotatable relative to the pair of flanges 6b. Each of the first supporting shafts 7 is fixed to the pair of flanges 6b and rotatably fitted in a corresponding one of the fitting holes 10c formed respectively in the belt support pieces 10. Each of the second supporting shafts 9 is fixed to the pair of belt guide members 8 and inscribed (or fitted) in a corresponding one of the elongated holes 10d formed respectively in the belt support pieces 10; each of the second supporting shafts 9 is relatively movable in the corresponding elongated hole 10d in the elongated direction of the corresponding elongated hole 10d. Moreover, the belt support pieces 10 are configured to be rotatable respectively about the corresponding first supporting shafts 7 within a range where the corresponding second supporting shafts 9 are relatively movable respectively in the corresponding elongated holes 10d with relative rotation between the power shaft 2 and the pair of belt guide members 8. The pulley apparatus 1 is configured to operate in the pulley driven mode when mechanical power is transmitted from the engine to the power shaft 2 via the pulley apparatus 1 and the belt 3 and in the pulley driving mode when mechanical power is transmitted from the power shaft 2 to the engine via the pulley apparatus 1 and the belt 3. In the pulley driven mode, the belt support pieces 10 rotate respectively about the corresponding first supporting shafts 7 in the direction making the belt supporting portions 10e of the belt support pieces 10 become closer to the power shaft 2 with the corresponding second supporting shafts 9 being relatively moved respectively in the corresponding elongated holes 10d toward the radially outer ends of the corresponding elongated holes 10d, causing the belt supporting portions 10e to be reduced in radius. On the other hand, in the pulley driving mode, the belt support pieces 10 rotate respectively about the corresponding first supporting shafts 7 in the direction making the belt supporting portions 10e of the belt support pieces 10 become further from the power shaft 2 with the corresponding second supporting shafts 9 being relatively moved respectively in the corresponding elongated holes 10d toward the radially inner ends of the corresponding elongated holes 10d, causing the belt supporting portions 10e to be increased in radius.

With the above configuration, when the operation of the motor-generator is shifted from the generator mode to the motor mode and thus the operation of the pulley apparatus 1 is shifted from the pulley driven mode to the pulley driving mode, it is possible to automatically increase the pulley diameter until the friction force between the belt 3 and the belt supporting portions 10e of the belt support pieces 10 commensurate with the transmission power (or torque) in the motor mode is obtained. That is, with the initial tension of the belt 3 set to a suitable (or required) tension for the generator mode of the motor-generator, when the operation of the motor-generator is shifted from the generator mode to the motor mode, it is possible to cause the belt supporting portions 10e of the belt support pieces 10 to be increased in radius and thereby increase the tension of the belt 3 to be commensurate with the transmission power in the motor mode. Consequently, with the increased tension of the belt 3, during the operation of the motor-generator in the motor mode, it is possible to reliably prevent the belt 3 from slipping against the belt supporting portions 10e of the belt support pieces 10. As a result, it is possible for the motor-generator to reliably start the engine or assist the engine in driving the vehicle.

Moreover, in the present embodiment, the relative movement of the corresponding second supporting shafts 9 in the corresponding elongated holes 10d and thus the increase in radius of the belt supporting portions 10e of the belt support pieces 10 are limited by the radially inner end position e of each of the corresponding elongated holes 10d (see FIGS. 5A and 8). Consequently, the tension of the belt 3 is prevented from becoming excessively high in the pulley driving mode. As a result, the transmission torque in the motor mode is limited to a required magnitude, thereby suppressing the load applied to the belt 3 and the pulley apparatus 1.

Furthermore, when the operation of the motor-generator in the motor mode is terminated and thus the operation of the motor-generator is shifted from the motor mode to the generator mode, the operation of the pulley apparatus 1 is accordingly shifted from the pulley driving mode to the pulley driven mode. Then, the belt supporting portions 10e of the belt support pieces 10 are reduced in radius and return to their initial state as shown in FIGS. 6 and 7. Consequently, the tension of the belt 3 is lowered to the initial tension that is set to the suitable tension for the generator mode of the motor-generator. As a result, it is possible to prevent the high load applied in the motor mode from being continuously applied to the belt 3 and the pulley apparatus 1 in the generator mode, thereby preventing excessive stress from being induced in, for example, the ball bearing 4 that rotatably supports the power shaft 2.

In the present embodiment, the belt 3 is supported by the belt supporting portions 10e of the belt support pieces 10 each of which has the predetermined circumferential length. Consequently, it becomes possible to increase the contact angle between the belt 3 and the belt supporting portions 10e of the belt support pieces 10 and thereby improve the power transmission capability in comparison with the first configuration example disclosed in Japanese Patent Application Publication No. JP2011185438A. As described previously in the "Description of Related Art" section, in the first configuration example disclosed in the above patent document, the belt is supported by a plurality of belt bearing pins.

Moreover, in the present embodiment, the belt supporting portions 10e of the belt support pieces 10 support the belt 3 from the radially inside of the belt 3. Consequently, it becomes possible to prevent flexure of the belt 3 when the belt supporting portions 10e of the belt support pieces 10 are increased in radius and thus the tension of the belt 3 is increased in the pulley driving mode. Furthermore, unlike in the second configuration example disclosed in the above patent document, there is no increase in the load applied to the side surfaces of the belt 3. As a result, it becomes possible to prevent deformation of the belt 3, thereby extending the service life of the belt 3. In addition, as described previously in the "Description of Related Art" section, in the second configuration example disclosed in the above patent document, the belt is sandwiched between a pair of conical members axially opposed to each other.

Second Embodiment

A pulley apparatus 1 according to a second embodiment has almost the same structure as the pulley apparatus 1 according to the first embodiment. Accordingly, only the differences therebetween will be described hereinafter.

In the first embodiment, the collar member 6 is formed separately from the power shaft 2 and fixed to the power shaft 2 by fastening the nut 5 onto the threaded portion 2c of the power shaft 2 (see FIGS. 1B and 2-3).

In contrast, in the present embodiment, the collar member 6 is formed integrally with the power shaft 2 into one piece.

Figure 11:
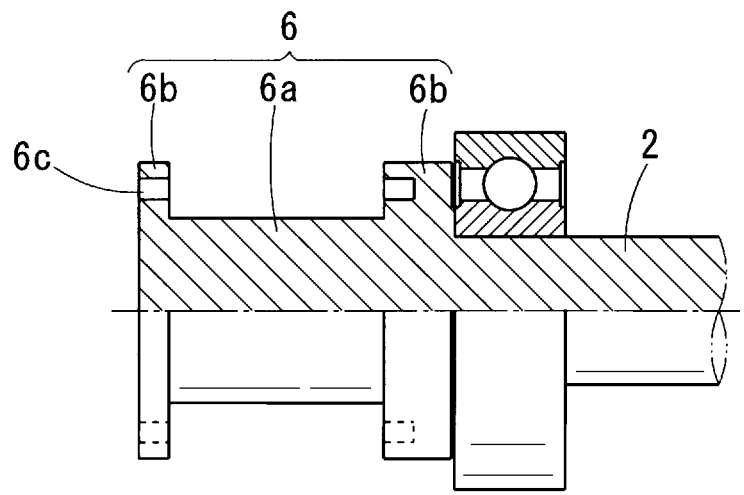
FIG. 11 is a half cross-sectional view, taken along an axial direction, of a collar member formed integrally with a power shaft into one piece in a pulley apparatus according to a second embodiment.
Figure 12:
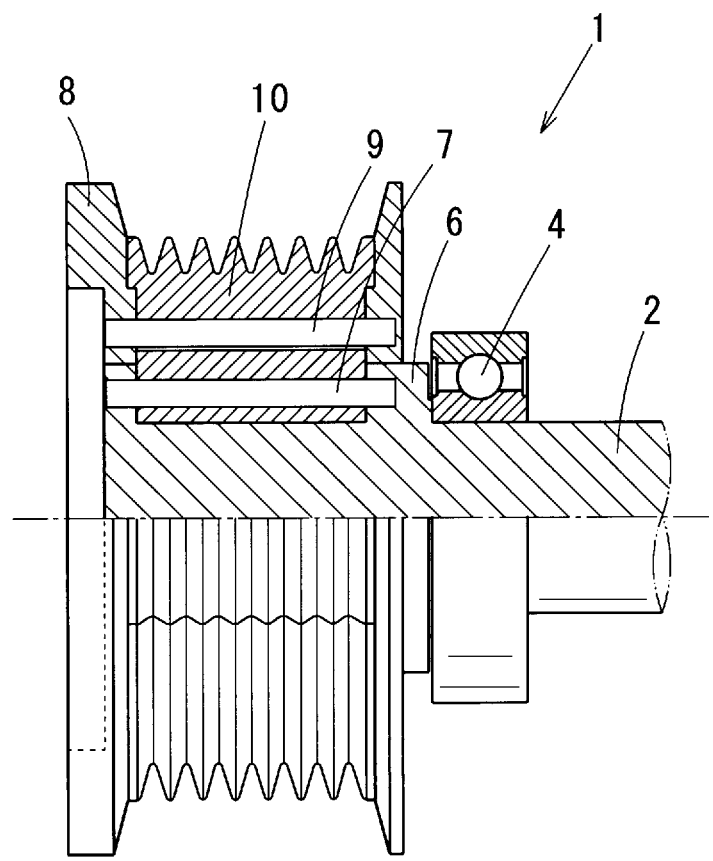
FIG. 12 is a half cross-sectional view, taken along the axial direction, of the pulley apparatus according to the second embodiment.

Specifically, in the present embodiment, as shown in FIGS. 11 and 12, all of the main body 6a and the flanges 6b of the collar member 6 are formed integrally with the power shaft 2 into one piece, so as to rotate together with the power shaft 2. Moreover, with the integral formation of the collar member 6 with the power shaft 2, it becomes unnecessary to form the threaded portion 2c in the power shaft 2 and fasten the nut 5 onto the threaded portion 2c of the power shaft 2 for the purpose of fixing the collar member 6 to the power shaft 2 as in the first embodiment. Accordingly, in the present embodiment, no threaded portion 2c is formed in the power shaft 2 and the nut 5 is omitted from the pulley apparatus 1.

According to the present embodiment, it is possible to achieve the same advantageous effects as achievable according to the first embodiment.

Moreover, according to the present embodiment, with the integral formation of the collar member 6 with the power shaft 2, it becomes possible to reduce the parts count of the pulley apparatus 1, thereby lowering the manufacturing cost and improving the productivity.

Third Embodiment

A pulley apparatus 1 according to a third embodiment has almost the same structure as the pulley apparatus 1 according to the first embodiment. Accordingly, only the differences therebetween will be described hereinafter.

In the first embodiment, each of the first supporting shafts 7 is fixed the pair of flanges 6b of the collar member 6; each of the second supporting shafts 9 is fixed to the pair of belt guide members 8. Moreover, each of the belt support pieces 10 has one fitting hole 10c and one elongated hole 10d formed therein. Furthermore, each of the first supporting shafts 7 is rotatably fitted in a corresponding one of the fitting holes 10c formed respectively in the belt support pieces 10; each of the second supporting shafts 9 is relatively movably inscribed (or fitted) in a corresponding one of the elongated holes 10d formed respectively in the belt support pieces 10 (see FIGS. 1A-1B, 2-4, 5A-5B and 6-9).

Figure 13:
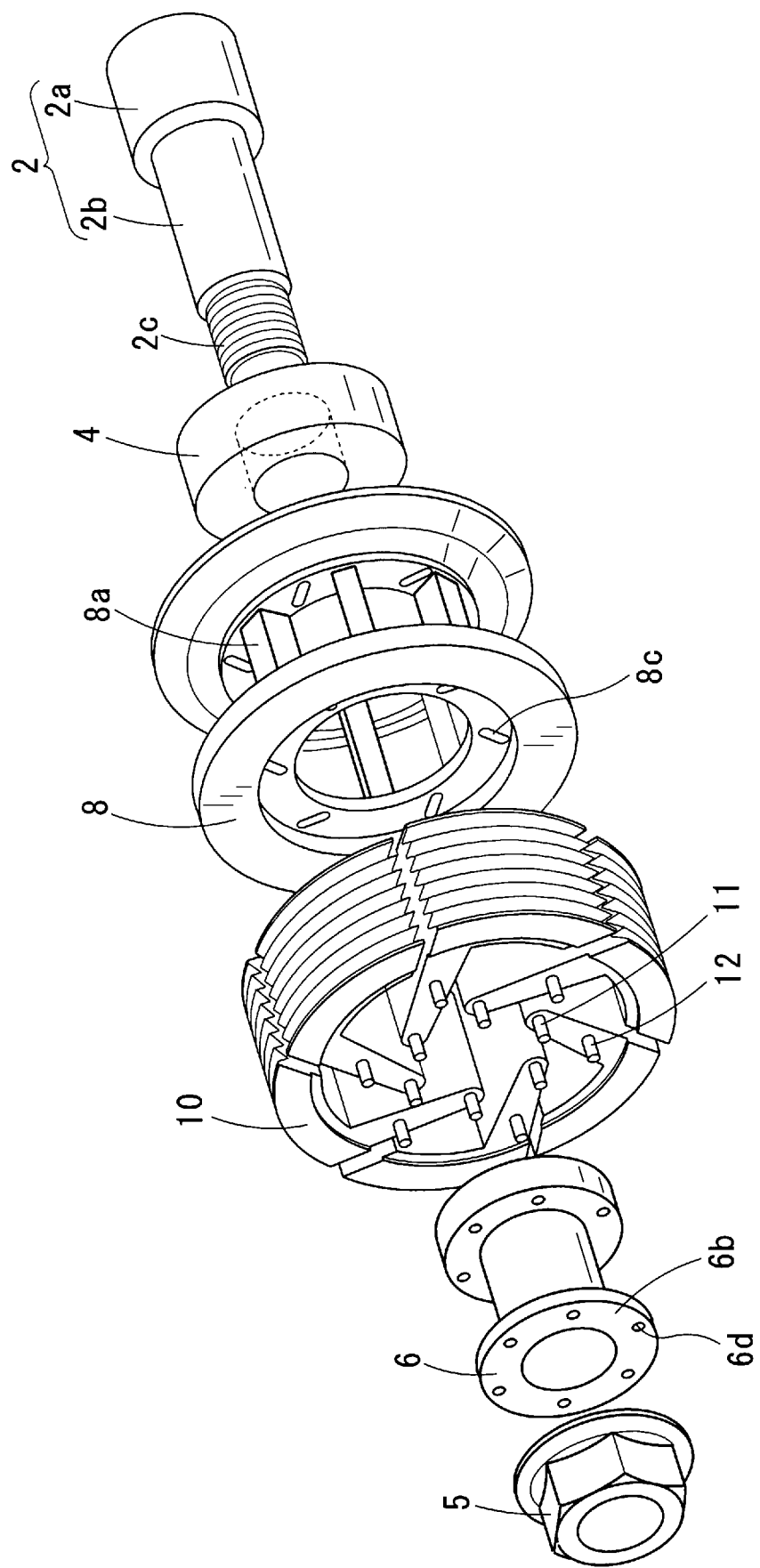
FIG. 13 is an exploded perspective view of a pulley apparatus according to a third embodiment.
Figure 14:
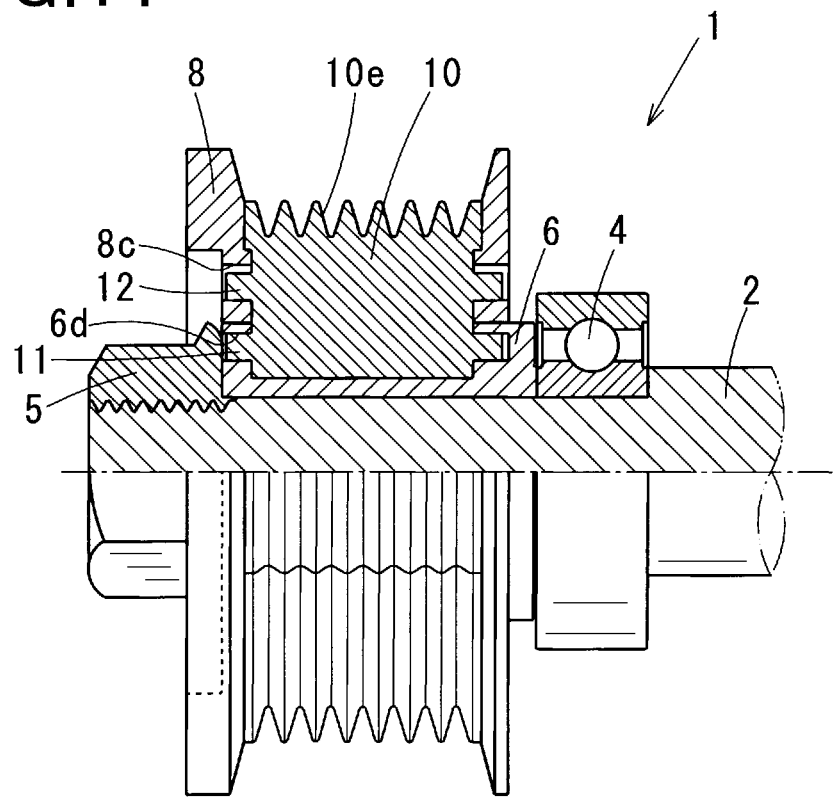
FIG. 14 is a half cross-sectional view, taken along an axial direction, of the pulley apparatus according to the third embodiment, wherein the pulley apparatus is in a pulley diameter-reduced state.
Figure 15:
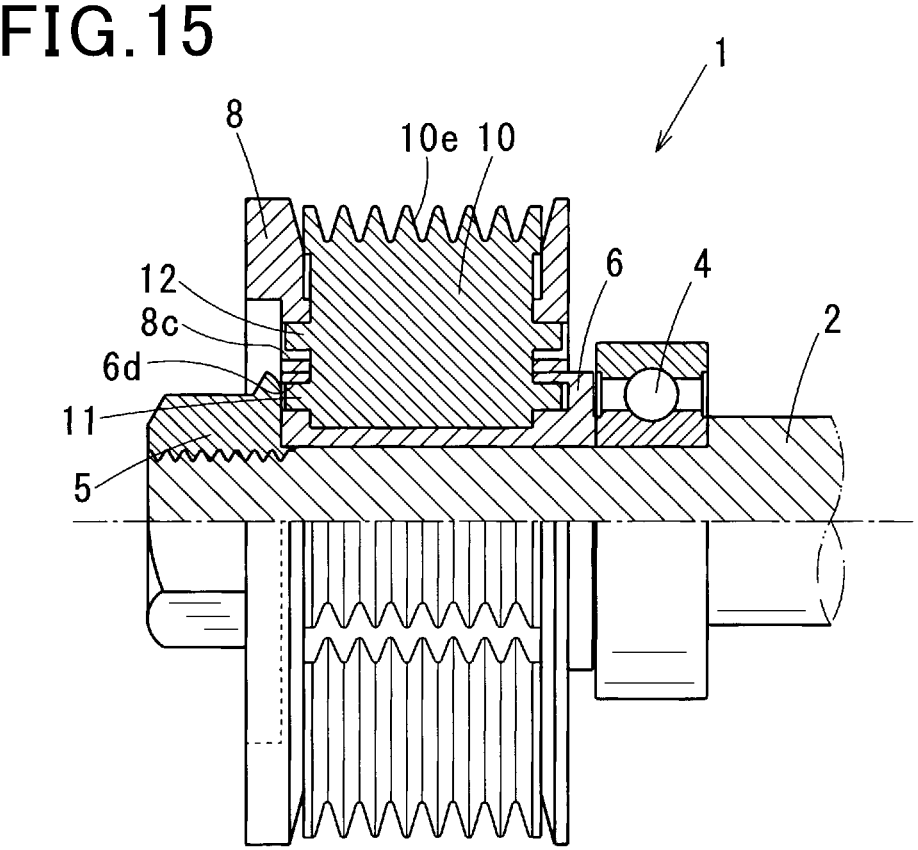
FIG. 15 is a half cross-sectional view, taken along the axial direction, of the pulley apparatus according to the third embodiment, wherein the pulley apparatus is in a pulley diameter-increased state.

In contrast, in the present embodiment, as shown in FIGS. 13-15, each of the belt support pieces 10 has a pair of first supporting pins (or members) 11 formed respectively on opposite axial end faces thereof. In other words, each of the first supporting pins 11 is formed integrally with a corresponding one of the belt support pieces 10 into one piece. Moreover, each of the belt support pieces 10 also has a pair of second supporting pins (or members) 12 formed respectively on opposite axial end faces thereof. In other words, each of the second supporting pins 12 is formed integrally with a corresponding one of the belt support pieces 10 into one piece. On the other hand, there are formed a plurality of fitting holes 6d in each of the pair of flanges 6b of the collar member 6; there are formed a plurality of elongated holes 8c in each of the pair of belt guide members 8. Furthermore, each of the first supporting pins 11 is rotatably fitted in a corresponding one of the fitting holes 6d formed in the pair of flanges 6b of the collar member 6; each of the second supporting pins 12 is relatively movably inscribed (or fitted) in a corresponding one of the elongated holes 8c formed in the pair of belt guide members 8.

FIG. 14 illustrates the pulley apparatus 1 according to the present embodiment in a state where the belt supporting portions 10e of the belt support pieces 10 are reduced in radius.

In the present embodiment, in the pulley driven mode, the belt support pieces 10 rotate respectively about the corresponding first supporting pins 11 in a direction making the belt supporting portions 10e of the belt support pieces 10 become closer to the power shaft 2 with the corresponding second supporting pins 12 being relatively moved respectively in the corresponding elongated holes 8c toward the radially outer ends of the corresponding elongated holes 8c, causing the belt supporting portions 10e to be reduced in radius.

FIG. 15 illustrates the pulley apparatus 1 according to the present embodiment in a state where the belt supporting portions 10e of the belt support pieces 10 are increased in radius.

In the present embodiment, in the pulley driving mode, the belt support pieces 10 rotate respectively about the corresponding first supporting pins 11 in a direction making the belt supporting portions 10e of the belt support pieces 10 become further from the power shaft 2 with the corresponding second supporting pins 12 being relatively moved respectively in the corresponding elongated holes 8c toward the radially inner ends of the corresponding elongated holes 8c, causing the belt supporting portions 10e to be increased in radius.

According to the present embodiment, it is possible to achieve the same advantageous effects as achievable according to the first embodiment.

While the above particular embodiments have been shown and described, it will be understood by those skilled in the art that various modifications, changes, and improvements may be made without departing from the spirit of the present invention.

For example, in the pulley apparatus 1 according to the third embodiment, the collar member 6 may alternatively be formed integrally with the power shaft 2 into one piece in the same manner as described in the second embodiment.

In the pulley apparatus 1 according to the first embodiment, in the radius-reduced state of the belt supporting portions 10e of the belt support pieces 10, $\beta=360°/n$, where $\beta$ is the center angle of each of the belt supporting portions 10e and $n$ is the number of the belt support pieces 10 and set to 6 in the first embodiment (see FIG. 6). However, n (i.e., the number of the belt support pieces 10) may alternatively be set to any other suitable integer greater than or equal to 2.

In addition, it should be noted that the expression "$\beta=360°/n$" is used to encompass both the case of $\beta$ being exactly equal to 360°/n and the case of ft being slightly deviated from 360°/n within an acceptable error range. For example, in the case of n being set 6, $\beta$ may be either exactly equal to 60° or in the range of 59.0° to 59.9°.

In the first embodiment, the engine constitutes (or functions as) both an external rotating machine that mechanically drives the motor-generator at the driven load thereof and a high-load rotating machine that has a higher driven load than the motor-generator and is mechanically driven by the motor-generator. That is, in the first embodiment, the external rotating machine is the same as the high-load rotating machine. However, the external rotating machine may be different from the high-load rotating machine. For example, the vehicle may be equipped with a first engine and a second engine; the first engine may constitute (or function as) the external rotating machine and the second engine may constitute (or function as) the high-load rotating machine.

The configurations of the pulley apparatuses 1 according to the first and third embodiments may be combined with each other. For example, the first supporting pins 11 and the fitting holes 6d described in the third embodiment may be employed in combination with the second supporting shafts 9 and the elongated holes 10d described in the first embodiment. Otherwise, the second supporting pins 12 and the elongated holes 8c described in the third embodiment may be employed in combination with the first supporting shafts 7 and the fitting holes 10c described in the first embodiment.

What is claimed is:

1. A pulley apparatus for a driving-driven rotating machine,
the driving-driven rotating machine having both a function of being mechanically driven at a driven load by an external rotating machine and a function of mechanically driving a high-load rotating machine that has a higher driven load than the driving-driven rotating machine,
the pulley apparatus being mounted on a power shaft of the driving-driven rotating machine and having a belt mounted thereon so that mechanical power is transmitted between the power shaft and a selected one of the external rotating machine and the high-load rotating machine via the pulley apparatus and the belt,
the pulley apparatus comprising:
a plurality of belt support pieces each having a belt supporting portion to support the belt from a radially inside of the belt, the belt supporting portions of the belt support pieces being arranged along a circumferential direction of the power shaft and each having a predetermined circumferential length;
a pair of flanges arranged respectively on opposite axial sides of the belt support pieces and configured to rotate together with the power shaft;
a pair of belt guide members fitted respectively on radially outer peripheries of the pair of flanges in such a manner as to be rotatable relative to the pair of flanges;
a plurality of first supporting members each of which is either fixed to the pair of flanges and rotatably fitted in a corresponding one of a plurality of fitting holes formed respectively in the belt support pieces or formed integrally with a corresponding one of the belt support pieces and rotatably fitted in a corresponding one of a plurality of fitting holes formed in the pair of flanges; and
a plurality of second supporting members each of which is either fixed to the pair of belt guide members and inscribed in a corresponding one of a plurality of elongated holes formed respectively in the belt support pieces or formed integrally with a corresponding one of the belt support pieces and inscribed in a corresponding one of a plurality of elongated holes formed in the pair of belt guide members, each of the second supporting members being relatively movable in the corresponding elongated hole in an elongated direction of the corresponding elongated hole,
wherein
the belt support pieces are configured to be rotatable respectively about the corresponding first supporting members within a range where the corresponding second supporting members are relatively movable respectively in the corresponding elongated holes with relative rotation between the power shaft and the pair of belt guide members,
the pulley apparatus is configured to operate in a pulley driven mode when mechanical power is transmitted from the external rotating machine to the power shaft via the pulley apparatus and the belt and in a pulley driving mode when mechanical power is transmitted from the power shaft to the high-load rotating machine via the pulley apparatus and the belt,
in the pulley driven mode, the belt support pieces rotate respectively about the corresponding first supporting members in a direction making the belt supporting portions of the belt support pieces become closer to the power shaft with the corresponding second supporting members being relatively moved respectively in the corresponding elongated holes toward radially outer ends of the corresponding elongated holes, causing the belt supporting portions to be reduced in radius, in the pulley driving mode, the belt support pieces rotate respectively about the corresponding first supporting members in a direction making the belt supporting portions of the belt support pieces become farther from the power shaft with the corresponding second supporting members being relatively moved respectively in the corresponding elongated holes toward radially inner ends of the corresponding elongated holes, causing the belt supporting portions to be increased in radius.

2. The pulley apparatus as set forth in claim 1, wherein each of the belt supporting portions of the belt support pieces has an arc-shaped cross section perpendicular to an axial direction of the power shaft, and in a radius-reduced state of the belt supporting portions, $\beta=360°/n$, where $\beta$ is a center angle of each of the belt supporting portions, which is defined as an angle between two imaginary lines radially extending respectively through circumferential ends of the belt supporting portion, and n is an integer greater than or equal to 2 representing the number of the belt support pieces.

3. The pulley apparatus as set forth in claim 1, wherein the belt is a V-ribbed belt, and each of the belt supporting portions of the belt support pieces has a cross section perpendicular to the circumferential direction which is shaped to match a cross section of the V-ribbed belt perpendicular to a longitudinal direction thereof.

4. The pulley apparatus as set forth in claim 1, wherein in the pulley driving mode, the relative movement of the corresponding second supporting members in the corresponding elongated holes and thus the increase in radius of the belt supporting portions of the belt support pieces are limited by a radially inner end position of each of the corresponding elongated holes.

5. The pulley apparatus as set forth in claim 1, wherein the driving-driven rotating machine is a motor-generator used in a vehicle, and both the external rotating machine and the high-load rotating machine are a prime mover of the vehicle.

6. The pulley apparatus as set forth in claim 1, wherein an outer radius of the belt guide member is larger than an outer radius of the belt support pieces.

* * * * *